(12) United States Patent
Samie et al.

(10) Patent No.: US 8,936,527 B2
(45) Date of Patent: *Jan. 20, 2015

(54) TRANSMISSION WITH RADIALLY STACKED GEAR SETS INCLUDING ANNULAR GEAR

(71) Applicant: GM Global Technology Operations LLC, Detroit, MI (US)

(72) Inventors: Farzad Samie, Franklin, MI (US); Kumaraswamy V. Hebbale, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/744,706

(22) Filed: Jan. 18, 2013

(65) Prior Publication Data

US 2013/0231211 A1    Sep. 5, 2013

Related U.S. Application Data

(60) Provisional application No. 61/606,125, filed on Mar. 2, 2012.

(51) Int. Cl.
 *F16H 1/32* (2006.01)
 *F16H 3/70* (2006.01)

(52) U.S. Cl.
 CPC ... *F16H 1/32* (2013.01); *F16H 3/70* (2013.01)
 USPC ...................................................... 475/177

(58) Field of Classification Search
 None
 See application file for complete search history.

(56) References Cited

U.S. PATENT DOCUMENTS

| | | | | |
|---|---|---|---|---|
| 627,383 A * | 6/1899 | Birrell | ........................... | 475/173 |
| 1,092,438 A * | 4/1914 | Fitch | .............................. | 475/173 |
| 1,123,396 A * | 1/1915 | Schoonmaker | ............... | 475/171 |
| 1,124,783 A * | 1/1915 | Moore | ......................... | 475/171 |
| 1,715,778 A * | 6/1929 | Orr | .............................. | 475/171 |
| 1,885,156 A * | 11/1932 | Thomas et al. | ............... | 475/172 |
| 2,214,001 A * | 9/1940 | Sneed | ......................... | 475/172 |
| 2,972,910 A * | 2/1961 | Menge, Sr. | ................... | 475/177 |
| 3,534,636 A * | 10/1970 | Lorence | ........................ | 475/177 |
| 3,729,276 A * | 4/1973 | Boyadjieff et al. | ............. | 418/59 |
| 6,126,566 A * | 10/2000 | Kerr | .............................. | 475/173 |
| 6,669,594 B2 * | 12/2003 | Kerr | .............................. | 475/173 |
| 8,529,392 B1 * | 9/2013 | Samie et al. | .................. | 475/177 |
| 8,585,527 B2 * | 11/2013 | Samie et al. | .................. | 475/177 |
| 2002/0108832 A1 | 8/2002 | Kerr | | |
| 2010/0048346 A1 | 2/2010 | Hoffman et al. | | |
| 2011/0009228 A1 | 1/2011 | Bauknecht et al. | | |
| 2011/0009229 A1 | 1/2011 | Bauknecht et al. | | |
| 2013/0231212 A1 * | 9/2013 | Samie et al. | .................. | 475/177 |
| 2013/0231213 A1 * | 9/2013 | Samie et al. | .................. | 475/177 |
| 2013/0231214 A1 * | 9/2013 | Samie et al. | .................. | 475/177 |

* cited by examiner

*Primary Examiner* — Dirk Wright

(74) *Attorney, Agent, or Firm* — Quinn Law Group, PLLC

(57) ABSTRACT

A transmission includes a first gear set with a first sun gear member rotatable about a first axis of rotation, a first carrier member, and a first ring gear member radially outward of and concentric with the first sun gear member. The first ring gear member has a radially inward-facing surface with inner teeth and a radially outward-facing surface with outer teeth. A second gear set has a second carrier member, and a second ring gear member radially outward of and concentric with the first ring gear member. The second ring gear member has a radially inward-facing surface with inner teeth. A first annular gear has a radially inward-facing surface with inner teeth and a radially outward-facing surface with outer teeth. The first annular gear is rotatable about a second axis of rotation and meshes with the first ring gear member.

14 Claims, 3 Drawing Sheets

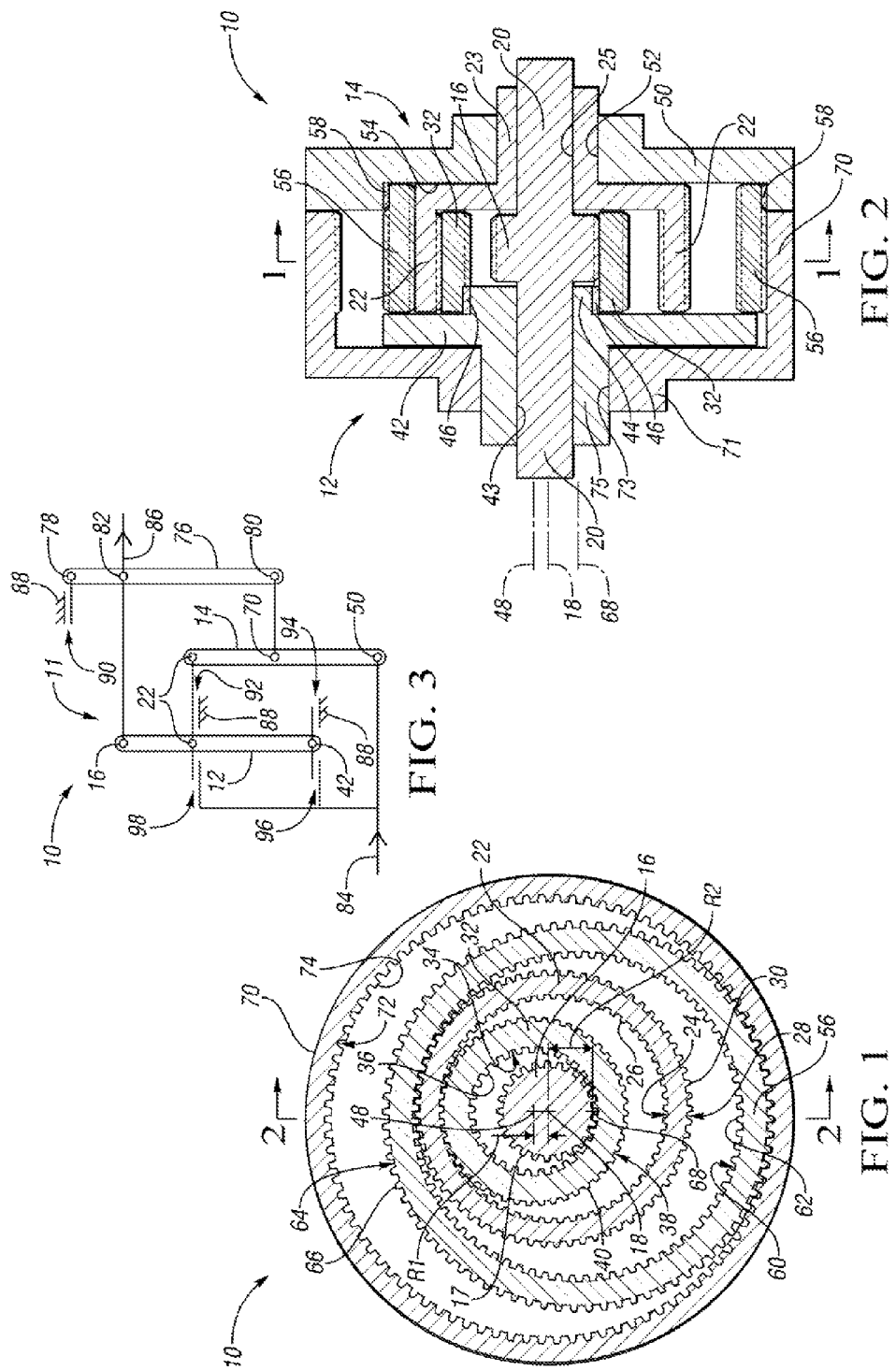

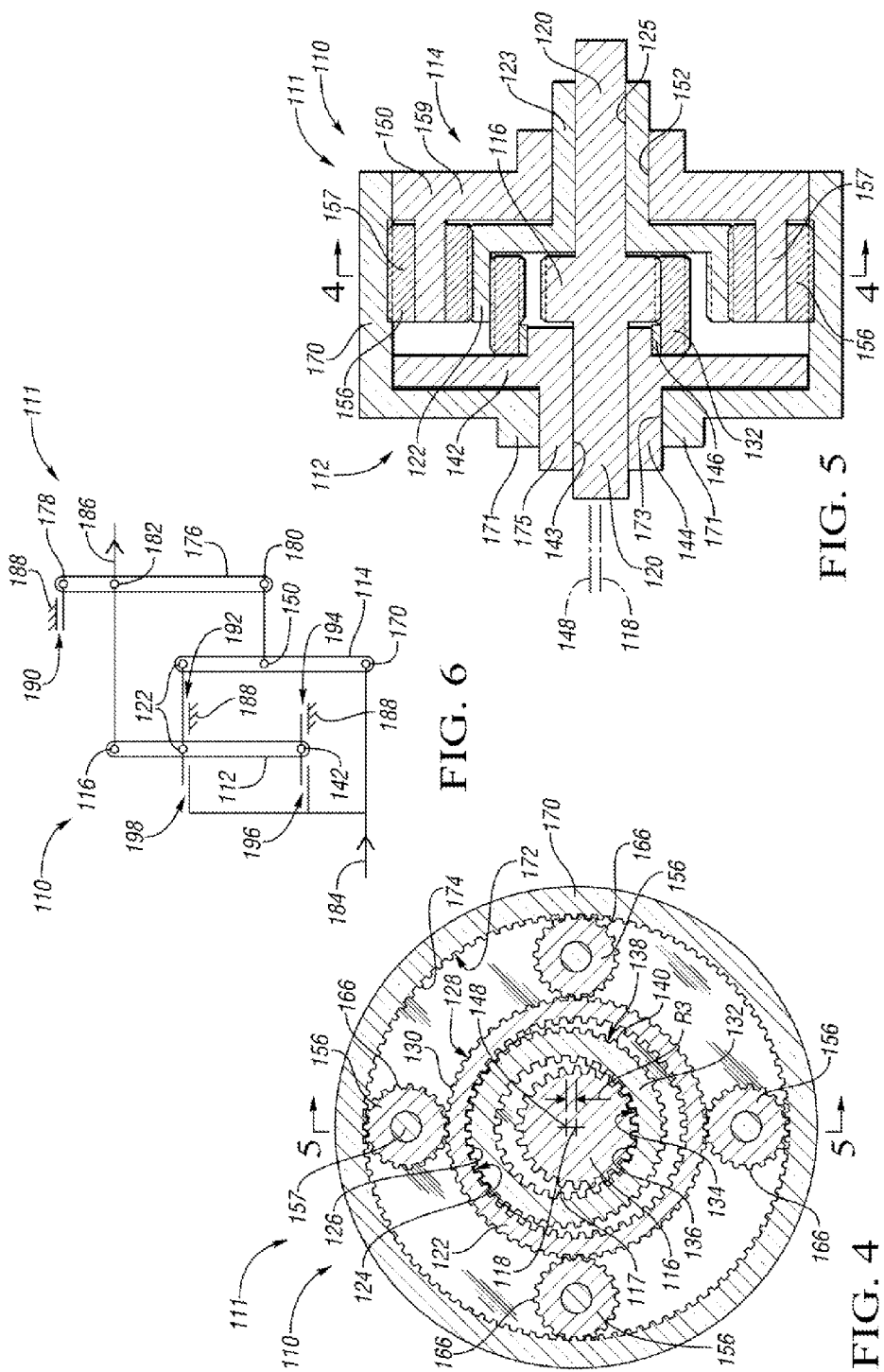

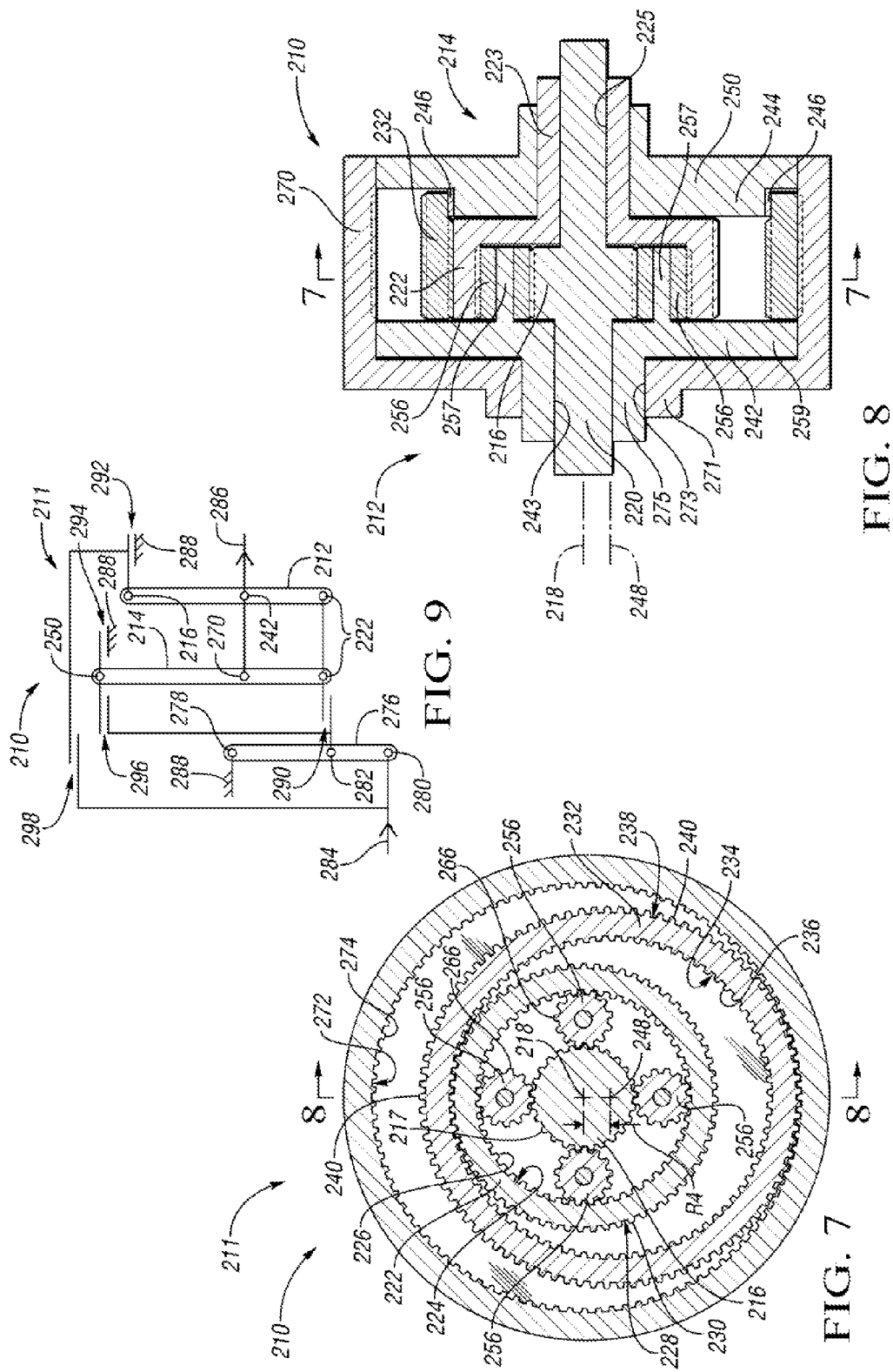

TRANSMISSION WITH RADIALLY STACKED GEAR SETS INCLUDING ANNULAR GEAR

CROSS-REFERENCE TO RELATED APPLICATION

U.S. Provisional Application No. 61/606,125 filed on Mar. 2, 2012 is hereby incorporated by reference in its entirety.

TECHNICAL FIELD

The present teachings generally include transmissions that have radially stacked gear sets.

BACKGROUND

Most passenger vehicles include a powertrain that has an engine, a multi-speed transmission, and a differential or final drive. The multi-speed transmission increases the overall operating range of the vehicle by permitting the engine to operate through its torque range a number of times. A primary focus of transmission and engine design is increasing vehicle fuel efficiency. Generally, an increased number of speed ratios provides greater fuel efficiency. However, it is challenging to package gear sets and selectively engageable torque-transmitting mechanisms to achieve the desired modes of operation while still meeting other applicable dimensional limitations and achieving relatively simple assembly requirements.

SUMMARY

A transmission is provided that has at least one coplanar gear set radially stacked with another gear set. Specifically, the transmission includes a first gear set that has a first sun gear member rotatable about a first axis of rotation, a first carrier member, and a first ring gear member radially outward of and concentric with the first sun gear member and rotatable about the first axis of rotation. The first ring gear member has a radially inward-facing surface defining inner teeth and a radially outward-facing surface defining outer teeth. A second gear set has a second carrier member, and a second ring gear member radially outward of and concentric with the first ring gear member and rotatable about the first axis of rotation. The second ring gear member has a radially inward-facing surface defining inner teeth. At least one of the first gear set and the second gear set includes a first annular gear having a radially inward-facing surface defining inner teeth and a radially outward-facing surface defining outer teeth. The first annular gear is rotatable about a second axis of rotation. The second axis of rotation rotates about the first axis of rotation. The first annular gear meshes with the first ring gear member.

By radially-stacking a coplanar gear set with an annular gear with another gear set that may or may not also be a coplanar gear set, axial space savings are achieved. Moreover, coplanar gear sets can achieve a wider gear set ratio range than a planetary gear set, have a high contact ratio, and relatively quiet operation.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic cross-sectional illustration of a portion of a first embodiment of a transmission including a coplanar gearing arrangement with first and second stacked gear sets taken at lines 1-1 in FIG. 2.

FIG. 2 is a schematic cross-sectional illustration of the portion of the transmission of FIG. 1 taken at lines 2-2 in FIG. 1.

FIG. 3 is a schematic illustration in lever diagram form of the transmission of FIGS. 1 and 2 including a third gear set.

FIG. 4 is a schematic cross-sectional illustration of a portion of a second embodiment of a transmission including a coplanar gearing arrangement with first and second stacked gear sets taken at lines 4-4 in FIG. 5.

FIG. 5 is a schematic cross-sectional illustration of the portion of the transmission of FIG. 4 taken at lines 5-5 in FIG. 4.

FIG. 6 is a schematic illustration in lever diagram form of the transmission of FIGS. 4 and 5 including a third gear set.

FIG. 7 is a schematic cross-sectional illustration of a portion of a third embodiment of a transmission including a coplanar gearing arrangement with first and second stacked gear sets taken at lines 7-7 in FIG. 8.

FIG. 8 is a schematic cross-sectional illustration of the portion of the transmission of FIG. 7 taken at lines 8-8 in FIG. 7.

FIG. 9 is a schematic illustration in lever diagram form of the transmission of FIGS. 7 and 8 including a third gear set.

DETAILED DESCRIPTION

Referring to the drawings, wherein like reference numbers refer to like components throughout the several views, FIGS. 1 and 2 show a portion of a transmission 10 that includes a gearing arrangement 11 with a first gear set 12 radially stacked with a second gear set 14. Both of the gear sets are coplanar gear sets, and the gearing arrangement is referred to as a stacked coplanar gearing arrangement. As used herein, a "coplanar gear set" is a gear set that includes an annular gear. As used herein, an "annular gear" is a gear that is generally cylindrical with radially inward-facing teeth (i.e., inner teeth) and radially outward-facing teeth (i.e., outer teeth) and has an axis of rotation that is offset from an axis of rotation of gears with which it meshes. An annular gear may also be referred to herein as a cluster gear. In some embodiments disclosed herein, the annular gear meshes at both its inner and outer teeth with other members of the same coplanar gear set. In other embodiments disclosed herein, the annular gear meshes at its inner teeth with a member of a first coplanar gear set and at its outer teeth with a member of a second coplanar gear set radially stacked with the first coplanar gear set.

The first gear set 12 has a first sun gear member 16 rotatable about a first axis of rotation 18. The first sun gear member 16 is mounted on and may be integrally formed with a center shaft 20. The first gear set 12 has a first ring gear member 22 that is radially outward of and concentric with the first sun gear member 16. The first ring gear member 22 has a hub 23 with a central opening 25 that receives the shaft 20. The first ring gear member 22 is thus supported by the shaft 20 and symmetrically positioned about the shaft 20 so that the first ring gear member 22 is rotatable about the first axis of rotation 18. The first sun gear member 16 has radially outward-facing teeth 17. The first ring gear member 22 has a radially inward-facing surface 24 with inner teeth 26 and a radially outward-facing surface 28 with outer teeth 30.

The first gear set 12 has a first annular gear 32 that has a radially inward-facing surface 34 with inner teeth 36 and a radially outward-facing surface 38 with outer teeth 40. The first gear set 12 also has a first carrier member 42. The first carrier member 42 has an inner opening 43 at which it is rotatably supported by the shaft 20. That is, the first carrier member 42 can rotate relative to the shaft 20 and the sun gear member 16. The first carrier member 42 also has a generally cylindrical hub 44 that is not centered with the first axis of rotation 18. The first annular gear 32 is supported by the hub 44 of the first carrier member 42 at a first set of cluster bearings 46 so that the first annular gear 32 is rotatable relative to the hub 44. Because the hub 44 is not centered with the first axis of rotation, the first annular gear 32 has a second axis of rotation 48 that is offset from the first axis of rotation 18. Specifically, the first annular gear 32 will rotate around the second axis of rotation 48, and as the first annular gear moves the second axis of rotation 48 will rotate around the first axis of rotation 18 in a circle with a radius R1 that is equal to the distance by which the second axis of rotation 48 is offset from the first axis of rotation 18. The outer teeth 40 of the first annular gear 32 mesh with the inner teeth 26 of the first ring gear member 22. The inner teeth 36 of the first annular gear 32 mesh with the teeth 17 of the sun gear member 16.

The second gear set 14 has a second carrier member 50 with an inner opening 52 that receives the hub 23 of the first ring gear member 22 so that the second carrier member 50 is rotatably supported by the hub 23 and the shaft 20. That is, the second carrier member 50 can rotate relative to the hub 23 and the shaft 20 about the first axis of rotation 18. The second carrier member 50 also has a generally cylindrical recess 54 that is not centered with the first axis of rotation 18. The second gear set 14 has a second annular gear 56 that is supported by the second carrier member 50 in the recess 54 with a second set of cluster bearings 58 between the second annular gear 56 and the second carrier member 50 so that the second annular gear 56 is rotatable relative to the second carrier member 50.

The second annular gear 56 has a radially inward-facing surface 60 with inner teeth 62 and a radially outward-facing surface 64 with outer teeth 66. Because the recess 54 is not centered with the first axis of rotation 18, the second annular gear 56 has a third axis of rotation 68 that is offset from the first axis of rotation 18. Specifically, the second annular gear 56 will rotate around the third axis of rotation 68, and as the second annular gear moves, the third axis of rotation 68 will rotate around the first axis of rotation 18 in a circle with a radius R2 that is equal to the distance by which the third axis of rotation 68 is offset from the first axis of rotation 18.

The second gear set 14 also has a second ring gear member 70 that is radially outward of and concentric with the first ring gear member 22. The second ring gear member 70 has a hub 71 with a central opening 73 that receives a hub 75 of the first carrier member 42. The second ring gear member 70 is thus ultimately supported by the shaft 20 and is rotatable about the first axis of rotation 18 relative to the first carrier member 42 and the shaft 20. The second ring gear member 70 has a radially inward-facing surface 72 with inner teeth 74. The outer teeth 66 of the second annular gear 56 mesh with the inner teeth 74 of the second ring gear member 70. The inner teeth 62 of the second annular gear 56 mesh with the outer teeth 30 of the first ring gear member 22. The first ring gear member 22 of the first gear set 12 thereby serves as a sun gear member of the second gear set 14. The first gear set 12 is radially stacked with the second gear set 14 as meshing of the first sun gear member 16 with the first annular gear 32, meshing of the first annular gear 32 with the first ring gear member 22, meshing of the first ring gear member 22 with the second annular gear 56, and meshing of the second annular gear 56 with the second ring gear member 70 all occur in a single radial plane perpendicular to the first axis of rotation 18.

The gearing arrangement 11 can be used within the transmission 10 along with various selectively engageable torque-transmitting mechanisms to provide multiple speed ratios in a relatively compact axial space. That is, because the first gear set 12 is radially stacked with the second gear set 14, the axial width occupied by the gearing arrangement 11 is less than the axial width that would be required for two axially-adjacent, simple planetary gear sets that would be necessary to provide the speed ratios available with the gearing arrangement 11. Moreover, because the radially stacking allows the first ring gear member 22 to also serve as a sun gear member of the second gear set 14, fewer components are required than if two separate planetary gear sets were used, potentially reducing weight and increasing fuel economy. Axial space savings, wide gear set ratio range, high contact ratio, and quiet operation can also be achieved.

The speed relationship between the members of the first gear set 12 is as follows:

$$w_{s1}=((1/k_1)*w_{r1})+(((k_1-1)/k_1)*w_{pc1}); \text{ and}$$

$k_1=(AC)/(BD)$; where $w_{s1}$ is the rotational speed in revolutions per minute (rpm) of the first sun gear member 16; $w_{r1}$ is the rotational speed in rpm of the first ring gear member 22, $w_{pc1}$ is the rotational speed in rpm of the first carrier member 42; A is the number of teeth 17 of the sun gear member 16; B is the number of inner teeth 36 of the first annular gear 32; C is the number of outer teeth 40 of the first annular gear 32; and D is the number of inner teeth 26 of the first ring gear member 22.

The speed relationship of the members of the second gear set 14 is as follows:

$$w_{s2}=((1/k_2)*w_{r2})+(((k_2-1)/k_2)*w_{pc2}); \text{ and}$$

$k_2=(EG)/(FH)$; where $w_{s2}$ is the rotational speed in revolutions per minute (rpm) of the first ring gear member 22 serving as a second sun gear member as discussed; $w_{r2}$ is the rotational speed in rpm of the second ring gear member 70; $w_{pc2}$ is the rotational speed in rpm of the second carrier member 50; E is the number of outer teeth 30 of the first ring gear member 22; F is the number of inner teeth 62 of the second annular gear 56; G is the number of outer teeth 66 of the second annular gear 56; and H is the number of inner teeth 74 of the second ring gear member 70.

FIG. 3 shows the transmission 10 including the gearing arrangement 11 and third gear set 76. The gearing arrangement 11 and the third gear set 76 are illustrated in lever diagram form as will be understood by a person of ordinary skill in the art. Specifically, in a lever diagram, the members of each gear set are represented as nodes on a lever. Nodes of different levers that are interconnected, either continuously or selectively, rotate at the same speed and function as a single node. As used herein, components of gear sets that are interconnected rotate at the same speed. The distance between each of the nodes on a lever is determined by the number of teeth of the gear members of the gear set represented by the lever.

The third gear set 76 has a sun gear member 78, a ring gear member 80, and a carrier member 82. Either a set of planetary gears can mesh both with the ring gear member 80 and the sun gear member 78, so that the third gear set 76 is a planetary gear set, or an annular gear can mesh with both the sun gear member 78 and the ring gear member 80 so that the third gear set 76 is a coplanar gear set that can be stacked with the first and second gear sets 12, 14.

The carrier member 82 of the third gear set 76 is continuously interconnected with the first sun gear member 16. The ring gear member 80 of the third gear set 76 is continuously interconnected with the second ring gear member 70. As previously discussed, the first ring gear member 22 also serves as the sun gear member of the second gear set 14. The first ring gear member 22 is thus schematically represented as a node on the lever of the first gear set 12, as well as a node on the lever of the second gear set 14.

The transmission 10 has an input member 84 continuously interconnected with the second carrier member 50, and an output member 86 continuously interconnected with the carrier member 82 of the third gear set 76. The transmission 10 has five selectively engageable torque-transmitting mechanisms 90, 92, 94, 96 and 98. The torque-transmitting mechanisms include a first torque-transmitting mechanism 90 that is selectively engageable to ground the sun gear member 78 of the third gear set 76 to a stationary member 88. As used herein, a "stationary member" is a non-rotating member. The stationary member 88 can be a transmission housing. A second torque-transmitting mechanism 92 is selectively engageable to ground the first ring gear member 22 to the stationary member 88. A third torque-transmitting mechanism 94 is selectively engageable to ground the first carrier member 42 to the stationary member 88. A fourth torque-transmitting mechanism 96 is selectively engageable to interconnect the first carrier member 42 with the input member 84. A fifth torque-transmitting mechanism 98 is selectively engageable to interconnect the first ring gear member 22 with the input member 84.

The five torque-transmitting mechanisms 90, 92, 94, 96 and 98 are selectively engaged in different combinations to establish six numerically different forward speed ratios and a reverse speed ratio of the input member 84 to the output member 86. A reverse speed ratio of the input member to the output member is established by engaging the second torque-transmitting mechanism 92 and the fourth torque-transmitting mechanism 96. A neutral state is established by engaging only the second torque-transmitting mechanism 92. A first forward speed ratio of the input member 84 to the output member 86 is established by engaging the first torque-transmitting mechanism 90 and the second torque-transmitting mechanism 92. A second forward speed ratio of the input member 84 to the output member 86 is established by engaging the first torque-transmitting mechanism 90 and the third torque-transmitting mechanism 94. A third forward speed ratio of the input member 84 to the output member 86 is established by engaging the first torque-transmitting mechanism 90 and the fourth torque-transmitting mechanism 96. A fourth forward speed ratio of the input member 84 to the output member 86 is established by engaging the first torque-transmitting mechanism 90 and the fifth torque-transmitting mechanism 98. A fifth forward speed ratio of the input member 84 to the output member 86 is established by engaging the fourth torque-transmitting mechanism 96 and the fifth torque-transmitting mechanism 98. A sixth forward speed ratio of the input member 84 to the output member 86 is established by engaging the third torque-transmitting mechanism 94 and the fifth torque-transmitting mechanism 98.

Transitions between each of the subsequent forward speed ratios are single transition shifts. One of the torque-transmitting mechanisms remains engaged during immediate subsequent ratios (i.e., first to second forward speed ratio, second to third forward speed ratio, third to fourth forward speed ratio, fourth to fifth forward speed ratio, and fifth to sixth forward speed ratio) while the engagement status of one other torque-transmitting mechanism changes. Additional speed ratios can be established by adding either or both of one or more additional gear sets and one or more additional torque-transmitting mechanisms (i.e., clutches or brakes) to the transmission 10.

FIGS. 4 and 5 show a portion of a transmission 110 that includes a gearing arrangement 111 with a first gear set 112 radially stacked with a second gear set 114. The first gear set 112 is a coplanar gear set, and the second gear set 114 is a planetary gear set. The gearing arrangement 111 is referred to as a stacked coplanar/simple planetary gearing arrangement.

The first gear set 112 has a first sun gear member 116 rotatable about a first axis of rotation 118. The first sun gear member 116 is mounted on and may be integrally formed with a center shaft 120. The first gear set 112 has a first ring gear member 122 that is radially outward of and concentric with the first sun gear member 116. The first ring gear member 122 has a hub 123 with a central opening 125 that receives the shaft 120. The ring gear member 122 is thus supported by the shaft 120 and symmetrically positioned about the shaft 120 so that the first ring gear member 122 is rotatable about the first axis of rotation 118. The first sun gear member 116 has radially outward-facing teeth 117. The first ring gear member 122 has a radially inward-facing surface 124 with inner teeth 126 and a radially outward-facing surface 128 with outer teeth 130.

The first gear set 112 has a first annular gear 132 that has a radially inward-facing surface 134 with inner teeth 136 and a radially outward-facing surface 138 with outer teeth 140. The first gear set 112 also has a first carrier member 142. The first carrier member 42 has an inner opening 143 at which it is rotatably supported by the shaft 120. That is, the first carrier member 142 can rotate relative to the shaft 120 and the sun gear member 116. The first carrier member 142 also has a generally cylindrical hub 144 that is not centered with the first axis of rotation 18. The first annular gear 132 is supported by the hub 144 of the first carrier member 142 at a first set of cluster bearings 146 so that the first annular gear 132 is rotatable relative to the hub 144. Because the hub 144 is not centered with the first axis of rotation 118, the first annular gear 132 has a second axis of rotation 148 that is offset from the first axis of rotation 118. Specifically, the first annular gear 132 will rotate around the second axis of rotation 148, and as the first annular gear 132 moves, the second axis of rotation 148 will rotate around the first axis of rotation 118 in a circle with a radius R3 that is equal to the distance by which the second axis of rotation 148 is offset from the first axis of rotation 118. The outer teeth 140 of the first annular gear 132 mesh with the inner teeth 126 of the first ring gear member 122. The inner teeth 136 of the first annular gear 132 mesh with the teeth 117 of the sun gear member 116.

The second gear set 114 has a second carrier member 150 with an inner opening 152 that receives the hub 123 of the first ring gear member 122 so that the second carrier member 150 is rotatably supported by the hub 123 and the shaft 120. That is, the second carrier member 150 can rotate relative to the hub 123 and supports a plurality of pinion gears 156 each having teeth 166. Each pinion gear 156 is supported on a respective pin 157 that extends from a carrier portion 159 of the second carrier member 150. The pinions 156 can each rotate about a respective pin 157 while the carrier member 150 can rotate about the first axis of rotation 18.

The second gear set 114 also has a second ring gear member 170 that is radially outward of and concentric with the first ring gear member 132. The second ring gear member 170 has a hub 171 with a central opening 173 that receives a hub 175 of the first carrier member 142. The second ring gear member 170 is thus ultimately supported by the shaft 120 and is rotatable about the first axis of rotation 118 relative to the first carrier member 142 and the shaft 120. The second ring gear member 170 has a radially inward-facing surface 172 with inner teeth 174. The teeth 166 of the pinion gears 156 mesh with the inner teeth 174 of the second ring gear member 170 and with the outer teeth 130 of the first ring gear member 122. The first ring gear member 122 of the first gear set 112 thereby serves as a sun gear member of the second gear set 114.

The gearing arrangement 111 can be used within the transmission 110 along with various selectively engageable torque-transmitting mechanisms to provide multiple speed ratios in a relatively compact axial space. That is, because the first gear set 112 is radially stacked with the second gear set 114, the axial width occupied by the gearing arrangement 111 is less than the axial width that would be required for two adjacent simple planetary gear sets that would be necessary to provide the speed ratios available with the gearing arrangement 111. Moreover, because the radially stacking allows the first ring gear member 122 to also serve as a sun gear member of the second gear set 114, fewer components are required than if two separate planetary gear sets were used, potentially reducing weight and increasing fuel economy.

The speed relationship between the members of the first gear set 112 is as follows:

$$w_{s1} = (1/k_1)*w_{r1} + ((k_1-1)/k_1)*w_{pc1}; \text{ and}$$

$k_1 = (AC)/(BD)$; where $w_{s1}$ is the rotational speed in revolutions per minute (rpm) of the first sun gear member 116; $w_{r1}$ is the rotational speed in rpm of the first ring gear member 122; $w_{pc1}$ is the rotational speed in rpm of the first carrier member 142; A is the number of teeth 117 of the sun gear member 116; B is the number of inner teeth 136 of the first annular gear 132; C is the number of outer teeth 140 of the first annular gear 132; and D is the number of inner teeth 126 of the first ring gear member 122.

The speed relationship of the members of the second gear set 114 is as follows:

$$w_{s2} + ((1/k_2)*w_{r2}) = (1/k_2+1)*w_{pc2}; \text{ and}$$

$k_2 = (E)/(G)$; where $w_{s2}$ is the rotational speed in revolutions per minute (rpm) of the first ring gear member 122 serving as a second sun gear member as discussed; $w_{r2}$ is the rotational speed in rpm of the second ring gear member 170; $w_{pc2}$ is the rotational speed in rpm of the second carrier member 150; E is the number of outer teeth 130 of the first ring gear member 122; and G is the number of inner teeth 174 of the second ring gear member 170.

FIG. 6 shows the transmission 110 including the gearing arrangement 111 and third gear set 176. The gearing arrangement 111 and the third gear set 176 are illustrated in lever diagram form as will be understood by a person of ordinary skill in the art. The third gear set 176 has a sun gear member 178, a ring gear member 180, and a carrier member 182. Either a set of pinion gears can mesh with the ring gear member 180 and the sun gear member 178, so that the third gear set 176 is a planetary gear set, or an annular gear can mesh with the sun gear member 178 and the ring gear member 180 so that the third gear set 176 is a coplanar gear set that can be stacked with the first and second gear sets 112, 114.

The carrier member 182 of the third gear set 176 is continuously interconnected with the first sun gear member 116. The ring gear member 180 of the third gear set 176 is continuously interconnected with the second carrier member 150. The transmission 110 has an input member 184 continuously interconnected with the second ring gear member 170, and an output member 186 continuously interconnected with the carrier member 182 of the third gear set 176.

The transmission 110 has five selectively engageable torque-transmitting mechanisms 190, 192, 194, 196 and 198. The torque-transmitting mechanisms include a first torque-transmitting mechanism 190 that is selectively engageable to ground the sun gear member 178 of the third gear set 176 to a stationary member 188. The stationary member 188 can be a transmission housing. A second torque-transmitting mechanism 192 is selectively engageable to ground the first ring gear member 122 to the stationary member 188. As previously discussed, the first ring gear member 122 also serves as the sun gear member of the second gear set 114. The first ring gear member 122 is thus schematically represented as a node on the lever of the first gear set 112, as well as a node on the lever of the second gear set 114.

A third torque-transmitting mechanism 194 is selectively engageable to ground the first carrier member 142 to the stationary member 188. A fourth torque-transmitting mechanism 196 is selectively engageable to interconnect the first carrier member 142 with the input member 184. A fifth torque-transmitting mechanism 198 is selectively engageable to interconnect the first ring gear member 122 with the input member 184.

The five torque-transmitting mechanisms 190, 192, 194, 196 and 198 are selectively engaged in different combinations to establish six numerically different forward speed ratios and a reverse speed ratio of the input member 184 to the output member 186. A reverse speed ratio of the input member to the output member is established by engaging the second torque-transmitting mechanism 192 and the fourth torque-transmitting mechanism 196. A neutral state is established by engaging only the second torque-transmitting mechanism 192. A first forward speed ratio of the input member 184 to the output member 186 is established by engaging the first torque-transmitting mechanism 190 and the second torque-transmitting mechanism 192. A second forward speed ratio of the input member 184 to the output member 186 is established by engaging the first torque-transmitting mechanism 190 and the third torque-transmitting mechanism 194. A third forward speed ratio of the input member 184 to the output member 186 is established by engaging the first torque-transmitting mechanism 190 and the fourth torque-transmitting mechanism 196. A fourth forward speed ratio of the input member 184 to the output member 186 is established by engaging the first torque-transmitting mechanism 190 and the fifth torque-transmitting mechanism 198. A fifth forward speed ratio of the input member 184 to the output member 186 is established by engaging the fourth torque-transmitting mechanism 196 and the fifth torque-transmitting mechanism 198. A sixth forward speed ratio of the input member 184 to the output member 186 is established by engaging the third torque-transmitting mechanism 196 and the fifth torque-transmitting mechanism 198.

Transitions between each of the subsequent forward speed ratios are single transition shifts. Additional speed ratios can be established by adding either or both of one or more additional gear sets and one or more additional torque-transmitting mechanisms (i.e., clutches or brakes) to the transmission 110.

FIGS. 7 and 8 show a portion of a transmission 210 that includes a gearing arrangement 211 with a first gear set 212 radially stacked with a second gear set 214. The first gear set 212 is a planetary gear set, and the second gear set 214 is a coplanar gear set. The gearing arrangement 211 is referred to as a stacked coplanar/simple planetary gearing arrangement.

The first gear set 212 has a first sun gear member 216 rotatable about a first axis of rotation 218. The first sun gear member 216 is mounted on and may be integrally formed with a center shaft 220. The first gear set 212 has a first ring gear member 222 that is radially outward of and concentric with the first sun gear member 216. The first ring gear member 222 has a hub 223 with a central opening 225 that receives the shaft 220. The ring gear member 222 is thus supported by the shaft 220 and symmetrically positioned about the shaft 220 so that the first ring gear member 222 is rotatable about the first axis of rotation 218. The first sun gear member 216 has radially outward-facing teeth 217. The first ring gear member 222 has a radially inward-facing surface 224 with inner teeth 226 and a radially outward-facing surface 228 with outer teeth 230.

The first gear set 212 has a first carrier member 242. The first carrier member 242 has an inner opening 243 at which it is rotatably supported by the shaft 220. That is, the first carrier member 242 can rotate relative to the shaft 220 and the sun gear member 216. The first carrier member 242 supports a plurality of pinion gears 256 each having teeth 266. Each pinion gear 256 is supported on a respective pin 257 that extends from a carrier portion 259 of the second carrier member 250. The pinions 256 can each rotate about a respective pin 257 while the carrier member 250 can rotate about the first axis of rotation 218. The teeth 266 of the pinion gears 256 mesh with the inner teeth 226 of the first ring gear member 222 and with the teeth 217 of the sun gear member 216.

The second gear set 214 includes a second carrier member 250 that has a generally cylindrical hub 244 that is not centered with the first axis of rotation 218. The second gear set 214 has a first annular gear 232 that is supported by the hub 244 of the second carrier member 250 at a first set of cluster bearings 246 so that the first annular gear 232 is rotatable relative to the hub 244. Because the hub 244 is not centered with the first axis of rotation 218, the first annular gear 232 has a second axis of rotation 248 that is offset from the first axis of rotation 218. Specifically, the first annular gear 232 will rotate around the second axis of rotation 248, and as the first annular gear 232 rotates the second axis of rotation 248 will rotate around the first axis of rotation 218 in a circle with a radius R4 that is equal to the distance by which the second axis of rotation 248 is offset from the first axis of rotation 218.

The second gear set 214 also has a second ring gear member 270 that is radially outward of and concentric with the first ring gear member 222. The second ring gear member 270 has a hub 271 with a central opening 273 that receives a hub 275 of the first carrier member 242. The second ring gear member 270 is thus ultimately supported by the shaft 220 and is rotatable about the first axis of rotation 218 relative to the first carrier member 242 and the shaft 220. The second ring gear member 270 has a radially inward-facing surface 272 with inner teeth 274. The first annular gear 232 has a radially inward-facing surface 234 with inner teeth 236 and a radially outward-facing surface 238 with outer teeth 240. The outer teeth 240 of the first annular gear 232 mesh with the inner teeth 274 of the second ring gear member 270. The inner teeth 236 of the first annular gear 232 mesh with the outer teeth 230 of the first ring gear member 222. The first ring gear member 222 of the first gear set 212 thereby serves as a sun gear member of the second gear set 214.

The gearing arrangement 211 can be used within the transmission 210 along with various selectively engageable torque-transmitting mechanisms to provide multiple speed ratios in a relatively compact axial space. That is, because the first gear set 212 is radially stacked with the second gear set 214, the axial width occupied by the gearing arrangement 211 is less than the axial width that would be required for two adjacent simple planetary gear sets that would be necessary to provide the speed ratios available with the gearing arrangement 211. Moreover, because the radially stacking allows the first ring gear member 222 to also serve as a sun gear member of the second gear set 214, fewer components are required than if two separate planetary gear sets were used, potentially reducing weight and increasing fuel economy.

The speed relationship between the members of the first gear set 212 is as follows:

$$w_{s1}+((1/k_1)*w_{r1})=((1/k_1)+1)*w_{pc1}; \text{ and}$$

$k_1=(A)/(C)$; where $w_{s1}$ is the rotational speed in revolutions per minute (rpm) of the first sun gear member 216; $w_{r1}$ is the rotational speed in rpm of the first ring gear member 222; $w_{pc1}$ is the rotational speed in rpm of the first carrier member 242; A is the number of teeth 217 of the sun gear member 216; and C is the number of inner teeth 226 of the first ring gear member 222.

The speed relationship of the members of the second gear set 214 is as follows:

$$w_{s2}=((1/k_2)*w_{r2})+(((k_2-1)/k_2)*w_{pc2}); \text{ and}$$

$k_2=(DF)/(EG)$; where $w_{s2}$ is the rotational speed in revolutions per minute (rpm) of the first ring gear member 222 serving as a sun gear member of the second gear set 214; $w_{r2}$ is the rotational speed in rpm of the second ring gear member 270; $w_{pc2}$ is the rotational speed in rpm of the second carrier member 250; D is the number of outer teeth 230 of the first ring gear member 222; E is the number of inner teeth 236 of the first annular gear 232; F is the number of outer teeth 240 of the first annular gear 232; and G is the number of inner teeth 274 of the second ring gear member 270.

FIG. 9 shows the transmission 210 including the gearing arrangement 211 and third gear set 276. The gearing arrangement 211 and the third gear set 276 are illustrated in lever diagram form as will be understood by a person of ordinary skill in the art. The third gear set 276 has a sun gear member 278, a ring gear member 280, and a carrier member 282. Either a set of pinion gears can mesh with the ring gear member 280 and the sun gear member 278, so that the third gear set 276 is a planetary gear set, or an annular gear can mesh with the sun gear member 278 and the ring gear member 280 so that the third gear set 276 is a coplanar gear set that can be stacked with the first and second gear sets 212, 214. The sun gear member 278 of the third gear set 276 is continuously grounded to the stationary member 288.

The transmission 210 has an input member 284 continuously interconnected with the ring gear member 280, and an output member 286 continuously interconnected with the first carrier member 242. As previously discussed, the first ring gear member 222 also serves as the sun gear member of the second gear set 214. The first ring gear member 222 is thus schematically represented as a node on the lever of the first gear set 212, as well as a node on the lever of the second gear set 214. The first carrier member 242 is continuously interconnected with the second ring gear member 270.

The transmission 210 has five selectively engageable torque-transmitting mechanisms 290, 292, 294, 296 and 298. The torque-transmitting mechanisms include a first torque-transmitting mechanism 290 that is selectively engageable to interconnect the first ring gear member 222 to the carrier member 282 of the third gear set 276. A second torque-transmitting mechanism 292 is selectively engageable to ground the first sun gear member 216 to a stationary member 288. The stationary member 288 can be a transmission housing. A third torque-transmitting mechanism 294 is selectively engageable to ground the second carrier member 250 to the stationary member 288. A fourth torque-transmitting mechanism 296 is selectively engageable to interconnect the second carrier member 250 with the carrier member 282 of the third gear set 276. A fifth torque-transmitting mechanism 298 is selectively engageable to interconnect the sun gear member 216 with the input member 284.

The five torque-transmitting mechanisms 290, 292, 294, 296 and 298 are selectively engaged in different combinations to establish six numerically different forward speed ratios and a reverse speed ratio of the input member 284 to the output member 286. A reverse speed ratio of the input member 284 to the output member 286 is established by engaging the second torque-transmitting mechanism 292 and the fourth torque-transmitting mechanism 296. A neutral state is established by engaging only the second torque-transmitting mechanism 292. A first forward speed ratio of the input member 284 to the output member 286 is established by engaging the first torque-transmitting mechanism 290 and the second torque-transmitting mechanism 292. A second forward speed ratio of the input member 284 to the output member 286 is established by engaging the first torque-transmitting mechanism 290 and the third torque-transmitting mechanism 294. A third forward speed ratio of the input member 284 to the output member 286 is established by engaging the first torque-transmitting mechanism 290 and the fourth torque-transmitting mechanism 296. A fourth forward speed ratio of the input member 284 to the output member 286 is established by engaging the first torque-transmitting mechanism 290 and the fifth torque-transmitting mechanism 298. A fifth forward speed ratio of the input member 284 to the output member 286 is established by engaging the fourth torque-transmitting mechanism 296 and the fifth torque-transmitting mechanism 298. A sixth forward speed ratio of the input member 284 to the output member 286 is established by engaging the third torque-transmitting mechanism 294 and the fifth torque-transmitting mechanism 298.

Transitions between each of the subsequent forward speed ratios are single transition shifts. Additional speed ratios can be established by adding either or both of one or more additional gear sets and one or more additional torque-transmitting mechanisms (i.e., clutches or brakes) to the transmission 210.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   a first gear set having:
      a first sun gear member rotatable about a first axis of rotation;
      a first carrier member;
      a first ring gear member radially outward of and concentric with the first sun gear member and rotatable about the first axis of rotation; wherein the first ring gear member has a radially inward-facing surface defining inner teeth and a radially outward-facing surface defining outer teeth;
   a second gear set having:
      a second carrier member;
      a second ring gear member radially outward of and concentric with the first ring gear member and rotatable about the first axis of rotation; wherein the second ring gear member has a radially inward-facing surface defining inner teeth;
   wherein at least one of the first gear set and the second gear set includes a first annular gear having a radially inward-facing surface defining inner teeth and a radially outward-facing surface defining outer teeth; wherein the first annular gear is rotatable relative to the first ring gear member about a second axis of rotation that rotates about the first axis of rotation; and
   wherein the first annular gear meshes with the first ring gear member.

2. The transmission of claim 1, wherein the inner teeth of the first annular gear mesh with the first sun gear member and the outer teeth of the first annular gear mesh with the inner teeth of the first ring gear member;
   wherein the second gear set has a second annular gear having a radially inward-facing surface with inner teeth and a radially outward-facing surface with outer teeth; wherein the second annular gear is rotatable about a third axis of rotation different than the second axis of rotation; wherein the third axis of rotation rotates about the first axis of rotation;
   wherein the inner teeth of the second annular gear mesh with the outer teeth of the first ring gear member; and
   wherein the outer teeth of the second annular gear mesh with the inner teeth of the second ring gear member.

3. The transmission of claim 2, further comprising:
   a first set of cluster bearings positioned between the first annular gear and the first carrier member to permit relative rotation thereof; and
   a second set of cluster bearings positioned between the second annular gear and the second carrier member to permit relative rotation thereof.

4. The transmission of claim 2, further comprising:
   a third gear set having a sun gear member, a ring gear member, and a carrier member;
   wherein the carrier member of the third gear set is continuously interconnected with the first sun gear member;
   wherein the ring gear member of the third gear set is continuously interconnected with the second ring gear member;
   an input member continuously interconnected with the second carrier member;
   an output member continuously interconnected with the carrier member of the third gear set;
   a stationary member;
   five torque-transmitting mechanisms including:
      a first torque-transmitting mechanism selectively engageable to ground the sun gear member of the third gear set to the stationary member;
      a second torque-transmitting mechanism selectively engageable to ground the first ring gear member to the stationary member;
      a third torque-transmitting mechanism selectively engageable to ground the first carrier member to the stationary member;
      a fourth torque-transmitting mechanism selectively engageable to interconnect the first carrier member with the input member;
      a fifth torque-transmitting mechanism selectively engageable to interconnect the first ring gear member with the input member; and
   wherein the five torque-transmitting mechanisms are selectively engaged in different combinations to establish six forward speed ratios and a reverse speed ratio of the input member to the output member.

5. The transmission of claim 4, wherein shifts between adjacent ones of the six forward speed ratios are single transition shifts.

6. The transmission of claim 1, wherein the inner teeth of the first annular gear mesh with the first sun gear member and the outer teeth of the first annular gear mesh with the inner teeth of the first ring gear member;
wherein the second gear set has pinion gears rotatably supported by the second carrier member; and wherein the pinion gears mesh with the outer teeth of the first ring gear member and with the inner teeth of the second ring gear member.

7. The transmission of claim 6, further comprising:
a first set of cluster bearings positioned between the first annular gear and the first carrier member to permit relative rotation thereof.

8. The transmission of claim 6, further comprising:
a third gear set having a sun gear member, a ring gear member, and a carrier member;
wherein the carrier member of the third gear set is continuously interconnected with the first sun gear member of the first gear set;
wherein the ring gear member of the third gear set is continuously interconnected with the second carrier member of the second gear set;
an input member continuously interconnected with the second ring gear member;
an output member continuously interconnected with the carrier member of the third gear set;
a stationary member;
five torque-transmitting mechanisms including:
 a first torque-transmitting mechanism selectively engageable to ground the sun gear member of the third gear set to the stationary member;
 a second torque-transmitting mechanism selectively engageable to ground the first ring gear member to the stationary member;
 a third torque-transmitting mechanism selectively engageable to ground the first carrier member to the stationary member;
 a fourth torque-transmitting mechanism selectively engageable to interconnect the first carrier member with the input member;
 a fifth torque-transmitting mechanism selectively engageable to interconnect the first ring gear member with the input member; and
wherein the five torque-transmitting mechanisms are selectively engaged in different combinations to establish six forward speed ratios and a reverse speed ratio of the input member to the output member.

9. The transmission of claim 1, wherein the inner teeth of the first annular gear mesh with the outer teeth of first ring gear member and the outer teeth of the first annular gear mesh with the inner teeth of the second ring gear member;
wherein the first gear set has pinion gears rotatably supported by the first carrier member; and wherein the pinion gears mesh with the outer teeth of the first sun gear member and with the inner teeth of the first ring gear member.

10. The transmission of claim 9, further comprising:
a first set of cluster bearings positioned between the first annular gear and the second carrier member to permit relative rotation thereof.

11. The transmission of claim 9, wherein the second ring gear member is interconnected with the first carrier member, and further comprising:
a third gear set having a sun gear member, a ring gear member, and a carrier member;
an input member continuously interconnected with the ring gear member of the third gear set;
an output member continuously interconnected with the first carrier member;
a stationary member; wherein the sun gear member of the third gear set is continuously grounded to the stationary member;
five torque-transmitting mechanisms including:
 a first torque-transmitting mechanism selectively engageable to interconnect the carrier member of the third gear set with the first ring gear member;
 a second torque-transmitting mechanism selectively engageable to ground the sun gear member of the first gear set to the stationary member;
 a third torque-transmitting mechanism selectively engageable to ground the second carrier member to the stationary member;
 a fourth torque-transmitting mechanism selectively engageable to interconnect the second carrier member with the carrier member of the third gear set;
 a fifth torque-transmitting mechanism selectively engageable to interconnect the sun gear member of the first gear set with the input member; and
wherein the five torque-transmitting mechanisms are selectively engaged in different combinations to establish six forward speed ratios and a reverse speed ratio of the input member to the output member.

12. A transmission comprising:
a first gear set having:
 a first sun gear member rotatable about a first axis of rotation;
 a first carrier member;
 a first ring gear member radially outward of and concentric with the first sun gear member and rotatable about the first axis of rotation; wherein the first ring gear member has a radially inward-facing surface defining inner teeth and a radially outward-facing surface defining outer teeth;
a second gear set having:
 a second carrier member;
 a second ring gear member radially outward of and concentric with the first ring gear member and rotatable about the first axis of rotation; wherein the second ring gear member has a radially inward-facing surface defining inner teeth;
wherein at least one of the first gear set and the second gear set includes a first annular gear having a radially inward-facing surface defining inner teeth and a radially outward-facing surface defining outer teeth; wherein the first annular gear is rotatable about a second axis of rotation that rotates about the first axis of rotation;
wherein the first annular gear meshes with the first ring gear member; wherein the inner teeth of the first annular gear mesh with the first sun gear member and the outer teeth of the first annular gear mesh with the inner teeth of the first ring gear member;
wherein the second gear set has a second annular gear having a radially inward-facing surface with inner teeth and a radially outward-facing surface with outer teeth; wherein the second annular gear is rotatable about a third axis of rotation different than the second axis of rotation; wherein the third axis of rotation rotates about the first axis of rotation; wherein the inner teeth of the second annular gear mesh with the outer teeth of the first ring gear member; wherein the outer teeth of the second annular gear mesh with the inner teeth of the second ring gear member;
a first set of cluster bearings positioned between the first annular gear and the first carrier member to permit relative rotation thereof;

a second set of cluster bearings positioned between the second annular gear and the second carrier member to permit relative rotation thereof;

a third gear set having a sun gear member, a ring gear member, and a carrier member;

wherein the carrier member of the third gear set is continuously interconnected with the first sun gear member; wherein the ring gear member of the third gear set is continuously interconnected with the second ring gear member;

an input member continuously interconnected with the second carrier member;

an output member continuously interconnected with the carrier member of the third gear set;

a stationary member;

five torque-transmitting mechanisms including:
- a first torque-transmitting mechanism selectively engageable to ground the sun gear member of the third gear set to the stationary member;
- a second torque-transmitting mechanism selectively engageable to ground the first ring gear member to the stationary member;
- a third torque-transmitting mechanism selectively engageable to ground the first carrier member to the stationary member;
- a fourth torque-transmitting mechanism selectively engageable to interconnect the first carrier member with the input member;
- a fifth torque-transmitting mechanism selectively engageable to interconnect the first ring gear member with the input member; and wherein the five torque-transmitting mechanisms are selectively engaged in different combinations to establish six forward speed ratios and a reverse speed ratio of the input member to the output member.

13. The transmission of claim 12, wherein shifts between adjacent ones of the six forward speed ratios are single transition shifts.

14. A transmission comprising:
a first gear set having:
- a first sun gear member rotatable about a first axis of rotation;
- a first carrier member;
- a first ring gear member radially outward of and concentric with the first sun gear member and rotatable about the first axis of rotation; wherein the first ring gear member has a radially inward-facing surface defining inner teeth and a radially outward-facing surface defining outer teeth;

a second gear set having:
- a second carrier member;
- a second ring gear member radially outward of and concentric with the first ring gear member and rotatable about the first axis of rotation; wherein the second ring gear member has a radially inward-facing surface defining inner teeth;

wherein at least one of the first gear set and the second gear set includes a first annular gear having a radially inward-facing surface defining inner teeth and a radially outward-facing surface defining outer teeth; wherein the first annular gear is rotatable about a second axis of rotation that rotates about the first axis of rotation;

wherein the first annular gear meshes with the first ring gear member;

wherein the inner teeth of the first annular gear mesh with the first sun gear member and the outer teeth of the first annular gear mesh with the inner teeth of the first ring gear member;

wherein the second gear set has pinion gears rotatably supported by the second carrier member; and wherein the pinion gears mesh with the outer teeth of the first ring gear member and with the inner teeth of the second ring gear member;

a first set of cluster bearings positioned between the first annular gear and the first carrier member to permit relative rotation thereof;

a third gear set having a sun gear member, a ring gear member, and a carrier member; wherein the carrier member of the third gear set is continuously interconnected with the first sun gear member of the first gear set; wherein the ring gear member of the third gear set is continuously interconnected with the second carrier member of the second gear set;

an input member continuously interconnected with the second ring gear member;

an output member continuously interconnected with the carrier member of the third gear set;

a stationary member;

five torque-transmitting mechanisms including:
- a first torque-transmitting mechanism selectively engageable to ground the sun gear member of the third gear set to the stationary member;
- a second torque-transmitting mechanism selectively engageable to ground the first ring gear member to the stationary member;
- a third torque-transmitting mechanism selectively engageable to ground the first carrier member to the stationary member;
- a fourth torque-transmitting mechanism selectively engageable to interconnect the first carrier member with the input member;
- a fifth torque-transmitting mechanism selectively engageable to interconnect the first ring gear member with the input member; and wherein the five torque-transmitting mechanisms are selectively engaged in different combinations to establish six forward speed ratios and a reverse speed ratio of the input member to the output member.

* * * * *